2,898,697
AUTOMATIC FISHING ROD AND POLE HOLDER

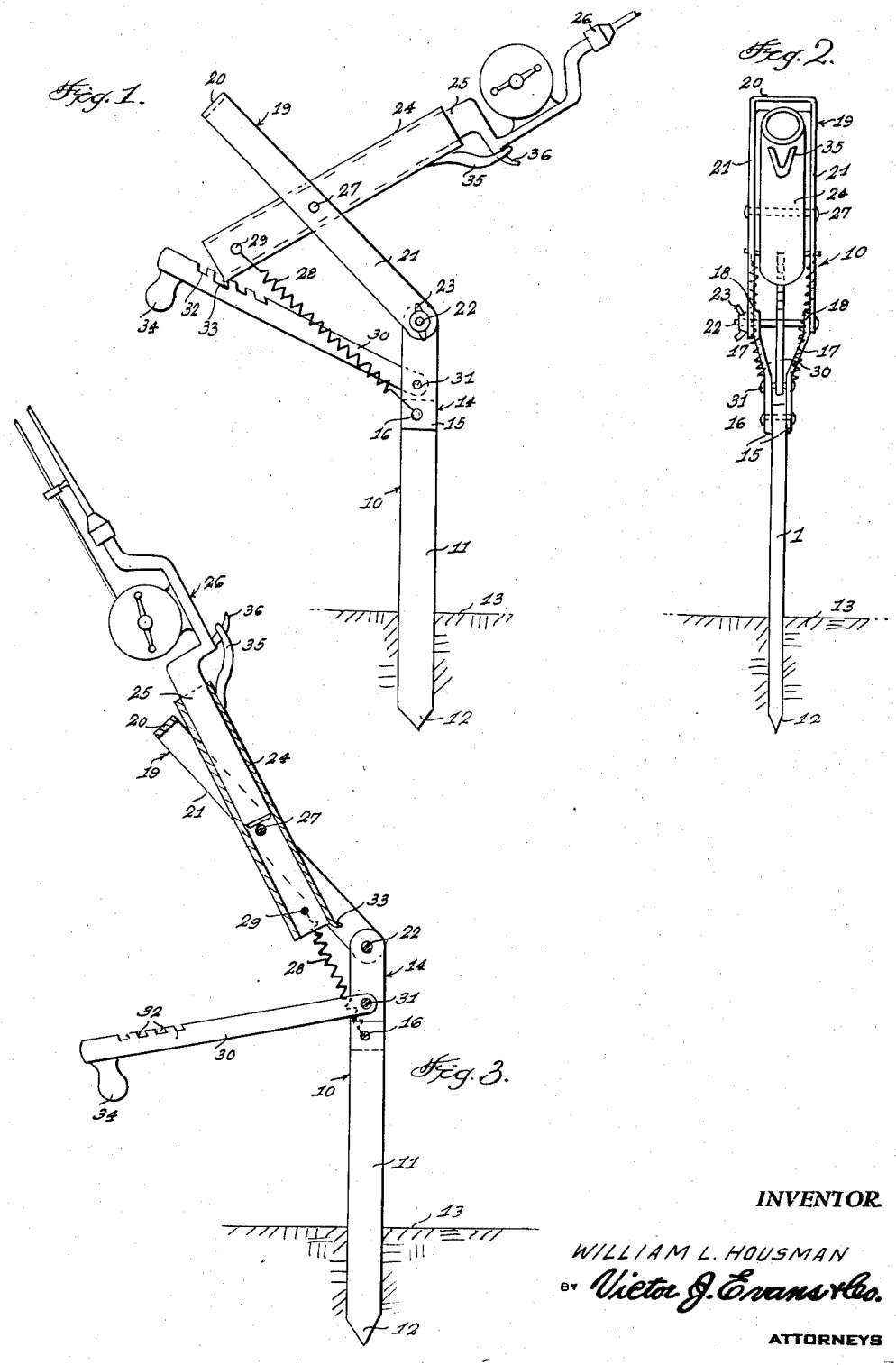

William L. Housman, Bay St. Louis, Miss.

Application July 11, 1958, Serial No. 747,941

3 Claims. (Cl. 43—15)

This invention relates to the art of fishing, and more particularly to a device for holding or supporting a fishing rod, fishing pole or the like.

The object of the invention is to provide a device which is adapted to be used for holding a fishing rod so that when a fish strikes the line, the device will be automatically actuated to snag or catch the fish.

Another object of the invention is to provide a device which can be mounted in a suitable location and wherein with the fishing line suspended in the water, when a fish strikes the bait or line, a triggering mechanism will be automatically actuated so as to snap the line or jerk the line whereby the fish will be snagged or hooked so that a person can readily retrieve or pull in the fish.

Another object of the invention is to provide an automatic fishing rod and pole holder which is extremely simple and inexpensive to manufacture.

Other objects and advantages will be apparent during the course of the following description.

In the accompanying drawings, forming a part of this application, and in which like numerals are used to designate like parts throughout the same.

Figure 1 is an elevational view illustrating the automatic fishing rod and pole holder of the present invention in use and in cocked or set position.

Figure 2 is a view illustrating the device and taken at right angles to the view shown in Figure 1.

Figure 3 is a view similar to Figure 1, but with parts broken away and in section, and showing the parts in different positions, as for example after a fish strikes the line.

Referring in detail to the drawings, the numeral 10 indicates the automatic fishing rod holder of the present invention which is shown to comprise a vertically disposed post 11 but may have its end pointed as at 12 whereby the post 11 can be readily inserted or driven into the ground 13. However, it isto be understood that the device can be used in other locations, as for example it can be mounted on a boat or pier or other structure.

There is further provided a pair of similar spaced apart arms which are each indicated by the numeral 14, and each arm 14 includes a lower portion 15 which is connected to the upper end of the post 11 by means of a securing element 16. Each arm 14 further includes an intermediate outwardly inclined portion 17 and an upper portion 18.

The numeral 19 indicates a U-shaped bracket which is adjustably connected to the upper ends of the arms 14, and the bracket 19 includes a pair of spaced parallel side sections 21 and a top piece 20. The numeral 22 indicates a pin or bolt which serves to connect the lower ends of the side sections 21 to the upper portions 18 of the arms 14, and a wing nut 23 is arranged in engagement with the bolt 22, as for example as shown in Figures 1 and 2. By loosening the wing nut 23, the bracket 19 can be pivoted to a desired location, as for example the parts can be moved to a somewhat collapsed position so that the device will occupy a minimum amount of space when it is not being used.

The numeral 24 indicates an open ended hollow tubular support member which is adapted to receive therein the handle 25 of a fishing rod 26. The support member 24 is pivotally mounted between the side sections 21 of the bracket 19 by means of a pivot pin 27.

There is further provided a pair of spaced apart coil springs or spring members 28 which are connected to the support member 24 as at 29, and the lower ends of the springs 28 are anchored to the pin 16.

The numeral 30 indicates a bar which has one end pivotally connected to the arms 14 by means of a pivot pin 31. The bar 30 is provided with a plurality of spaced parallel notches or slots 32. As shown in the drawings, the slots 32 are inclined or arranged angularly with respect to the longitudinal axis of the bar 30, and these slots 32 are adapted to selectively receive therein a finger or keeper 33 on an end of the support member 24. The numeral 34 indicates a weight which is secured to or formed integral with the outer end of the bar 30 for normally urging the bar 30 downward.

From the foregoing, it is apparent that there has been provided a device which is adapted to be used for supporting a fishing rod so that when a fish strikes the line, the device will be automatically actuated so as to snag or catch the fish. In use the device is adapted to be set as shown in Figure 1 so that the handle 25 of the fishing rod 26 is received in the support member 24. The support member 24 includes an extension 35 which is adapted to engage a portion 36 of the fishing rod 26 so as to help steady the fishing rod 25. It is to be noted that with the parts in the position of Figure 1, the finger 33 engages one of the slots 32 in the bar 30, and the post 11 is adapted to be positioned in such a manner that a fishing line will dangle or be suspended in the water.

With the parts arranged as shown in Figure 1, it will be seen that when a fish attempts to take the bait, a slight pressure will be applied to the fishing rod 26, this slight pressure resulting from the fish engaging the line will cause the finger 33 to move out of the slot 32 in the bar 30 so that the weight 34 can move the bar 30 downward from the position shown in Figure 1 to the position shown in Figure 3. This permits the pair of springs 28 to snap or move the support member 24 from the position shown in Figure 1 to the position shown in Figure 3 so that the fishing line will be jerked or snapped whereby the fish will be hooked. Then, the user can readily reel in the fish and remove the fish from the line.

After the fish has been removed from the line, the parts can be returned to the position shown in Figure 1 so that the device is ready to be used again.

It is to be noted that according to the present invention there has been provided a device which will automatically become actuated when a fish strikes a line so that a person can leave the device unattended after it has been properly set whereby when a fish strikes the line the line will be jerked or snapped so as to snag or hook the fish whereby the fish can be pulled in in the usual manner.

The parts can be made of any suitable material and in different shapes or sizes.

It is to be noted that the slots 32 are arranged angularly with respect to the longitudinal axis of the bar 30, and this arrangement of the slots 32 together with the finger 33 serves to insure that when the parts are in the position shown in Figure 1, that the support member 24 will be properly held in cocked position, and when a fish strikes the line, the finger 33 can disengage from the corresponding slot 32.

The pin 27 serves to pivotally connect the support member 24 to the side sections 21 of the bracket 19. This pin 27 also serves as a stop member and engages the inner end of the handle 25 when the fishing rod is in the position shown in Figures 1 and 2.

The wing nut 23 can be loosened so as to permit the bracket 19 to be moved to different positions, and also by loosening the wing nut 23 the parts such as the bracket 19 can be moved to a folded or collapsed position when the device is not being used.

It is to be understood that the present invention is not restricted to any particular type of fishing rod since any type of fishing rod or fishing pole can be used in the device.

When setting the device, the pole or rod is positioned in the support member or barrel 24 and then the support member 24 is moved to the position shown in Figure 1 and the trigger or finger 33 is set in the proper slot 32. When a fish strikes, the finger 33 will release and the springs 28 will jerk the support member 24 back to the position shown in Figure 3 from the position shown in Figure 1 so as to hook the fish. Thus, it will be seen that there has been provided a fishing rod and pole holder which will automatically catch fish when the fish jerks or pulls on the line.

Minor changes in shape, size and rearrangement of details coming within the field of invention claimed may be resorted to in actual practice, if desired.

I claim:

1. In a device of the character described, a vertically disposed post, a pair of arms having lower portions secured to the upper end of said post, said arms further including intermediate outwardly inclined portions and upper spaced parallel portions, a U-shaped bracket including a pair of spaced parallel side sections having their lower ends adjustably connected to the upper portions of said arms, said bracket further including a top piece connecting the upper ends of said side sections to retain said side sections in spaced parallel relation to each other, a hollow open ended tubular support member pivotally connected to the side sections of said support member, said support member serving to receive and hold a portion of a fishing rod therein, a bar having its lower end pivotally connected to the lower portions of said arms, there being a plurality of spaced apart slots in said bar, a curved finger on an end of said support member for engagement selectively with said slots, a weight connected to the upper portion of said bar, and spring members connected to said support member for bracing said support member rearwardly to snap the fishing rod to catch a fish when said bar is released from engagement with said support member.

2. The structure as defined in claim 1, and further including an extension on said support member for engagement with a portion of the fishing rod to steady the fishing rod in said support member.

3. In a device of the character described, a vertically disposed post, a pair of arms having lower portions secured to the upper end of said post, said arms further including intermediate outwardly inclined portions and upper spaced parallel portions, a U-shaped bracket including a pair of spaced parallel side sections having their lower ends adjustably connected to the upper portions of said arms, said bracket further including a top piece, a hollow open ended tubular support member pivotally connected to the side sections of said support member, said support member serving to receive and hold a portion of a fishing rod therein, a bar having its lower end pivotally connected to the lower portions of said arms, there being a plurality of spaced apart slots in said bar, a curved finger on an end of said support member for engagement selectively with said slots, a weight connected to the upper portion of said bar for normally urging said bar toward a position of disengagement of said finger and slots, and spring members connected to said support member for normally urging said support member toward said bar and being operable to forcefully pivot said support member upon disengagement of said finger and said slot, said finger and slot structure being disengageable to releasably retain the support member in a set position against action of the spring members, an extension on said support member for engagement with a portion of the fishing rod to steady the fishing rod in said support member, said slots being inclined and being arranged angularly with respect to the longitudinal axis of the bar.

References Cited in the file of this patent
UNITED STATES PATENTS

| | | |
|---|---|---|
| 2,564,840 | Glenn | Aug. 21, 1951 |
| 2,642,690 | Soenksen | June 23, 1953 |
| 2,703,465 | Di Stefano | Mar. 8, 1955 |
| 2,740,219 | Harden | Apr. 3, 1956 |